US008935675B1

(12) United States Patent
Vrable et al.

(10) Patent No.: US 8,935,675 B1
(45) Date of Patent: Jan. 13, 2015

(54) STATISTICAL SAMPLING OF EVENT MONITORING TRIGGERS UNDER OVERHEAD CONSTRAINTS

(71) Applicant: Google Inc., Mountain View, CA (US)

(72) Inventors: Michael Daniel Vrable, Mountain View, CA (US); Ulfar Erlingsson, Mountain View, CA (US); Yinqian Zhang, Chapel Hill, NC (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/036,186

(22) Filed: Sep. 25, 2013

(51) Int. Cl.
*G06F 9/44* (2006.01)
*G06F 11/34* (2006.01)

(52) U.S. Cl.
CPC ................... *G06F 11/3466* (2013.01)
USPC .......................................................... 717/128

(58) Field of Classification Search
USPC .......................................................... 717/128
See application file for complete search history.

(56) References Cited

U.S. PATENT DOCUMENTS

| | | | | |
|---|---|---|---|---|
| 5,896,536 | A * | 4/1999 | Lindsey | 717/128 |
| 6,754,891 | B1 * | 6/2004 | Snyder et al. | 717/128 |
| 6,941,492 | B1 * | 9/2005 | Ezra et al. | 714/38.13 |
| 7,401,322 | B1 * | 7/2008 | Shagam et al. | 717/128 |
| 7,634,761 | B2 * | 12/2009 | Buschardt et al. | 717/129 |
| 8,346,509 | B2 | 1/2013 | Davies | |
| 8,745,591 | B2 * | 6/2014 | De Smet et al. | 717/125 |
| 2004/0250242 | A1 * | 12/2004 | Berry et al. | 717/128 |
| 2008/0134148 | A1 * | 6/2008 | Clark | 717/128 |
| 2008/0244533 | A1 * | 10/2008 | Berg et al. | 717/128 |
| 2011/0126172 | A1 * | 5/2011 | Lakshminarayanachar et al. | 717/125 |
| 2012/0124487 | A1 | 5/2012 | Edgar et al. | |
| 2013/0080641 | A1 | 3/2013 | Lui et al. | |
| 2013/0097709 | A1 | 4/2013 | Basavapatna et al. | |
| 2013/0305226 | A1 * | 11/2013 | Carey et al. | 717/128 |

* cited by examiner

*Primary Examiner* — Don Wong
*Assistant Examiner* — Theodore Hebert
(74) *Attorney, Agent, or Firm* — Fox Rothschild LLP

(57) ABSTRACT

A method includes receiving a budget cost for monitoring a plurality of tracepoints that occur as a result of operation of a device. The method further includes organizing a plurality of tracepoints into buckets such that each of the buckets corresponds to a range of expected interarrival times, and all tracepoints in a bucket have an expected interarrival time that is within the range for that bucket. The method further includes assigning a trigger to a first plurality of the bucketed tracepoints to yield a plurality of triggered tracepoints, wherein the triggers are proportionally assigned such that a tracepoint having a low expected interarrival time is less likely to be assigned a trigger than an tracepoint having a associated expected interarrival time such that an expected cost of the triggered tracepoints does not exceed the budget cost. Additionally, the method includes monitoring tracepoint occurrence during a first period of operation.

20 Claims, 4 Drawing Sheets

STATISTICAL SAMPLING OF EVENT MONITORING TRIGGERS UNDER OVERHEAD CONSTRAINTS

BACKGROUND

Typical computing systems include a monitoring mechanism for estimating how often certain events happen during execution of one or more applications. For example, a monitoring mechanism may install multiple triggers, each trigger associated with a particular event. As the application operates, the triggers are fired as an event occurs, thus providing an indication to the monitoring mechanism of the event occurrence. However, there are various costs associated with such a monitoring approach: (1) a cost associated with installation and removal of the triggers; and (2) a cost when a trigger is fired. The first cost may be reduced by installing and removing triggers in batches at the same time. However, there is a fundamental problem with the second cost. When a large number of triggers fire in a short period of time, the sum total of the second cost may overwhelm available resources and cause performance issues of the system being monitored. Such a large number of triggers may cause an apparent pause in the execution of the computer system, as the system is using all available resources to process the firing of the triggers. A pause may result in a timeout-based failure detector rendering the computer system inoperable.

Typically, the monitoring system assigns the triggers randomly to events and then monitors the triggered events for a specific time period before removing the triggers. Such an approach can result in inaccurate monitoring as the events are assigned triggers randomly. Additionally, as described above, a flurry of events may be called at the same time, resulting in a high number of triggers that exceeds the time and resources devoted to monitoring the events, thus resulting in a system execution error.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In one embodiment, a method may include receiving, by a sampling module, a budget cost for monitoring occurrence of a plurality of tracepoints that may occur as a result of operation of a processing device. The method may further include organizing a plurality of tracepoints into a plurality of buckets such that each of the buckets corresponds to a range of expected interarrival times, and all tracepoints in a bucket have an expected interarrival time that is within the corresponding range for that bucket. The method may further include assigning a trigger to a first plurality of the bucketed tracepoints to yield a plurality of triggered tracepoints, wherein the triggers are proportionally assigned such that a tracepoint having a low associated expected interarrival time is less likely to be assigned a trigger than an tracepoint having a high associated expected interarrival time, wherein an expected cost of the triggered tracepoints does not exceed the budget cost. Additionally, the method may include monitoring tracepoint occurrence during a first period of operation of the processing device for occurrence of triggered tracepoints.

In another embodiment, a system may include a processing device and a non-transitory storage medium operably connected to the processing device and configured to store a set of instructions. The instructions, when executed, may cause the processing device to assign each of a plurality of tracepoints to one of a plurality of buckets based upon an expected interarrival time of that tracepoint, proportionally assign one or more triggers to the plurality of tracepoints such that the triggers are distributed amongst each of the plurality of buckets, monitor execution of a computer program for an event occurrence related to one or more triggered tracepoints being triggered for a first period of time, in response to an event occurrence, process a called tracepoint to identify and remove the trigger associated with the called tracepoint and record that the tracepoint has been called, and, after the first period of time has elapsed, turn off all remaining triggers associated with tracepoints that were not called during the first time period.

In another embodiment, a method may include monitoring, by a processing device, tracepoint occurrence during a first period of operation of the processing device for a plurality of triggered tracepoints. The method may further includes determining a triggering time associated with each triggered tracepoint of the plurality of triggered tracepoints that has not been called as well as determining a probability for each of the plurality of triggered tracepoints that have not been called, wherein the probability indicates whether a tracepoint is likely to be called before expiration of the first period of operation. Additionally, the method may include determining a total remaining time based upon each tracepoint that is probable to be called before expiration of the first period of operation, wherein the total remaining time is a sum of the triggering times for each of the tracepoints that is probable to be called and, if the total remaining time exceeds a remaining time left in the first period of operation, shutting off all remaining triggers in a single batch operation.

DETAILED DESCRIPTION

Figure 1:
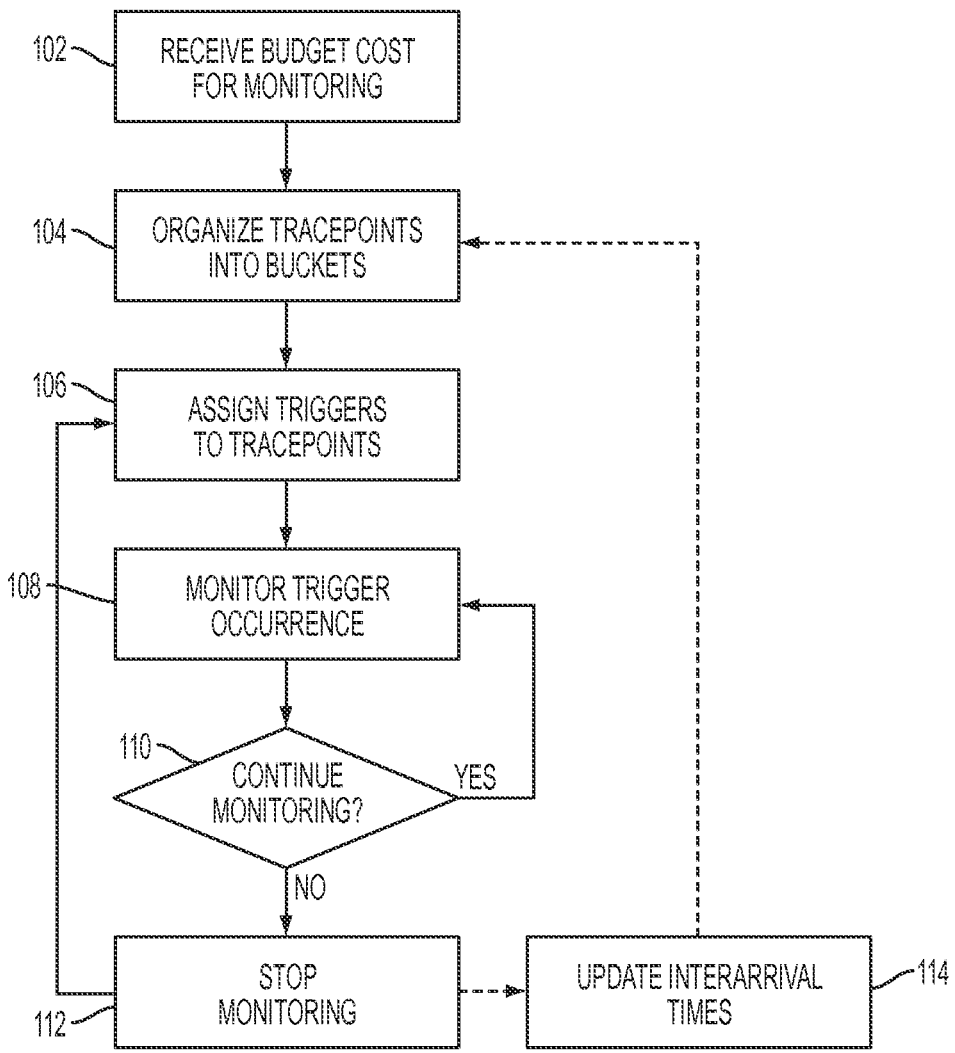
FIG. 1 depicts a sample flowchart for monitoring the execution of a program to determine if an event has been called according to various embodiments.

The following terms shall have, for purposes of this application, the respective meanings set forth below:

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute computer-readable instructions of a computer program or application.

A "tracepoint" refers to a user-space function, system call, instruction, or sequence of instructions that occurs during execution of a computer program or application. During operation of the computer program, the function or system call including the tracepoint may occur, resulting in the potential firing of a trigger.

A "trigger" refers to a mechanism that may "fire" upon the use of a tracepoint in software execution, where such firing entails a monitoring system being notified of the specific, identified tracepoint that was used. For example, a trigger may include a modification to a tracepoint's source code such that, when the tracepoint is called, a trigger occurrence is reported to the monitoring system. As used herein, a trigger has an associated cost for setting the trigger, firing the trigger, and removing the trigger.

A "bucket" refers to a storage structure such as a buffer for storing computer-readable data Typically a bucket has a fixed size determined upon creation, and may alternatively be empty or non-empty. As used herein, a bucket specifically refers to a storage structure into which tracepoints may be sorted based upon various characteristics of the tracepoints such as expected interarrival time.

A "measurement" refers to a single effort of monitoring a given tracepoint. A measurement may or may not observe each occurrence of a tracepoint during execution of the computer program or application.

The present disclosure proposes a unique monitoring approach including the use of such event monitoring triggers to sample computer system execution to establish properties about its behavior, such as the relative frequency of different types of events, the inter-arrival time between events, and the environmental state present at each event occurrence.

In the event monitoring method and system as described herein, individual tracepoints are organized onto a plurality of buckets based on a partitioning of their observed inter-arrival times, such as a disjoint based on the logarithm of those times. The buckets may be organized such that the interarrival times grouped within each bucket grow exponentially. For example, bucket one may include tracepoints having an expected interarrival time of 0-1 second, bucket two may include tracepoints having an expected interarrival time of 1-2 seconds, bucket three may have include tracepoints having an expected interarrival time of 2-4 seconds, bucket four may include tracepoints having an expected interarrival time of 4-8 seconds, and additional buckets may be included in a similar manner. Triggers are placed on tracepoints in buckets to provide for an accurate and unbiased sampling of all tracepoints to be monitored. A proportional number of triggers may be placed on tracepoints from different buckets in such a way that the total expected number of triggers fired in any time interval does not (with high probability) exceed a specified cost budget.

For example, if the specified cost budget is 10% of operating time, the triggers may be placed on tracepoints within the buckets such that the expected time to execute all triggers called within a certain observation time (e.g., 1 second) does not exceed the cost budget (e.g., 10% of the monitoring time, or 0.10 seconds in this example).

To maintain accurate expected interarrival times (and, thus, to maintain accurate organization of tracepoints within the individual buckets), tracepoint bucketing may be updated based on observations from triggers, using multiple estimators to deal with both permanent behavior changes as well as temporarily behavioral changes for individual tracepoints. For example, a software update, or a change in the software inputs or workload, may cause a tracepoint that was previously called on rare occasions to be called at a much higher frequency, thus reducing its interarrival time. Additionally, to retain high-probability that cost budgets are not exceeded, various conservative fallbacks in bucketing such as reduced trigger allocation to tracepoints having low interarrival times (i.e., tracepoints that are likely to be called during the monitoring period).

Additional disaster-recovery techniques may be included that prevent cost budgets from ever being exceeded. For example, the monitoring as described in the present invention may include removing triggers in batches—proactively—if measurements indicate that the system could possibly (even if still perhaps unlikely) be in danger of exceeding the cost budget if no steps were taken.

FIG. 1 illustrates an example of a sampling strategy that may be used to monitor tracepoint occurrence during execution of a computer application. On a system level, such monitoring capability may be enabled by selective system call monitoring in the kernel space (for monitoring system call occurrences), and dynamic breakpoints in the user space (when monitoring function call occurrences).

As shown in FIG. 1, a monitoring system such as a computing device associated with managing a distributed computing network may receive 102 an acceptable budgeted cost for performing monitoring of various tracepoints associated with computer applications running or that may run on the network. For example, as referenced above, the budgeted cost may be 10% of operating time is devoted to monitoring. However, it should be noted that this is shown by way of example only and additional budget costs may be used. It should also be noted that the processes and techniques as described herein are designed such that the budget cost is never exceed. Unlike the prior art where a large number of triggers firing may cause system failures, the techniques described herein include additional security features to prevent the budget cost from being exceeded.

The monitoring device may organize 104 a set of tracepoints into a multiple buckets based upon how likely the tracepoint is to occur. For example, the monitoring system may initialize three buckets for a particular computer application. The first bucket may include all tracepoints for that application that have an expected interarrival time (IAT) or 0-1 seconds. As used herein, the expected IAT for a tracepoint represents how long from the beginning of monitoring (or the beginning of execution of the application) until the tracepoint is expected to occur. The second bucket may include all tracepoints for that application that have an expected IAT of 1-3 seconds. The third bucket may include all tracepoints for that application that have an expected IAT of greater than 3 seconds. It should be noted that the times associated with the buckets are used by example only. Additional bounds may be used for determining the structure of the buckets. For example, the buckets may be divided based upon a logarithmic time division such that the time periods associated with the buckets increases exponentially. In this case, a first bucket may be associated with 1-2 seconds, a second bucket may be associated with 2-4 seconds, a third bucket may be associated with 4-8 seconds, a fourth bucket may be associated with 8-16 seconds, and so on.

Figure 2:
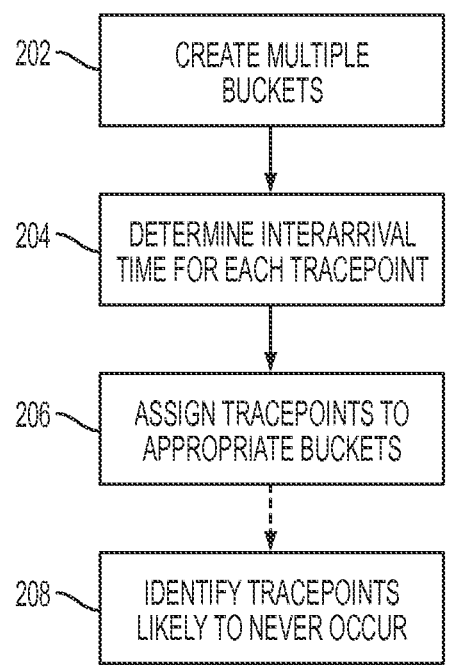
FIG. 2 depicts a sample flowchart for organizing tracepoints into buckets according to various embodiments.

FIG. 2 provides additional detail related to the organization 104 of the tracepoints into individual buckets. The monitoring system may create 202 the multiple buckets. As noted above, various divisional techniques may be used for creating 202 the individual buckets. For example, a logarithmic time division may be used. A total interarrival time range may be determined for the tracepoints being monitored, and the total time range may be logarithmically divided into a number or intermediate ranges (e.g., 1-2 seconds, 2-4 seconds, 4-8 seconds, etc.). Each individual intermediate range may be assigned to a particular bucket such that each bucket corresponds to a unique range of time.

It should also be noted that creating 202 the buckets may be standard for all applications a monitoring system is monitoring (i.e., standard buckets used for all applications), uniquely created for each application when the application is initially launched (i.e., the same set of buckets is used for the application each subsequent launch), or created each time an application is run (i.e., a unique set of buckets may be used each time the application is launched).

The monitoring system may also determine 204 the expected IATs for each of the tracepoints associated with the application being monitored. In order to determine 204 the expected IATs for the tracepoints, the monitoring system may use historical data such as previous monitoring records. Additionally, the monitoring system may receive data related to the IATs from the manufacturer or programmer of the application, that relates common expected IATs based upon historical or anticipated application use.

However, to accurately determine expected IATs for the tracepoints as the application is currently running, the monitoring system may determine 204 the expected IATs based upon recent historical information. For example, the monitoring system may have records indicating N measurements of a single tracepoint T, e.g., $T_1, T_2, T_3, \ldots, T_N$. Each measurement may also have an associated timeout count C, e.g., $C_1, C_2, C_3, \ldots, C_N$, where $C_i$ is equal to one if the tracepoint was observed (i.e., triggered) during measurement i and is equal to zero if the tracepoint was not observed during measurement i. If the window size of the exponential moving average algorithm is k, then the IAT estimator may be defined as:

$$\text{Est}(N) = \alpha * \text{sum}(T_{(N-k+1)}, \ldots, TN)/\text{sum}(C_{(N-k+1)}, \ldots, C_N) = (1-\alpha) * \text{Est}(N-k)$$

A coarser estimate may be obtained using an individual bucket of tracepoints, i.e., the expected IAT of a tracepoint in bucket x may be assumed to be no less than $2^x$ unit time, and no greater than $2^{x+1}$ unit time, where x is the bucket index (e.g., 0-10). Thus, x=floor(log 2(Est(N))). For example, the buckets may be arranged such that the index of an individual bucket specifically corresponds to the time range associated with that bucket. However, it should be noted that this is merely an example of assigning index ranges to buckets, and additional techniques may be used in alternative embodiments. Additionally, the bucket estimator may also be used to estimate any tracing overhead.

Based upon the determined expected IATs for each tracepoint, whether estimated as shown above or based upon historical IAT times, the tracepoints may be assigned 206 to the appropriately corresponding bucket. Additionally and/or optionally, the monitoring system may also use the determined expected IATs to identify 208 individual tracepoints that are likely to never occur. Depending upon the application, various tracepoints may be highly unlikely to be called during a monitoring period, and may have associated expected IATs that are thousands to times greater than the monitoring period, making the occurrence of these tracepoints during execution of the application highly unlikely. In such a case, the tracepoints may be bucketed appropriately with other tracepoints that are likely to never be called. During review or troubleshooting, such identified 208 tracepoints may be examined by an administrator or a programmer to determine if the tracepoints may be safely removed from the application.

Referring again to FIG. 1, the monitoring device may assign 106 a plurality of triggers to each tracepoint to be monitored. In order to assign 106 a trigger to a tracepoint, a specific code segment or other similar diversion may be inserted into the machine code for a particular tracepoint such that when that tracepoint is called the monitoring system is notified. If the tracepoint is called, the monitoring system may receive notification and remove the triggering code segment from the machine code.

In order to accurately and precisely monitor operation of the computer application, the monitoring system may assign 106 the triggers based upon the likelihood of a tracepoint occurring. For example, a smaller number of triggers are assigned to tracepoints that have a low expected IAT, i.e., events that are more likely to occur during the monitoring. Conversely, a high number of triggers may be assigned 106 to tracepoints that have a higher expected IAT, i.e., events that are less likely to occur during monitoring. For example, a tracepoint may be considered to have a low expected IAT if its associated expected IAT is less than the monitoring time multiplied by a specific multiplier. In an example, if the expected IAT for a tracepoint is less than 10*monitoring time, it is considered to have a low expected IAT and thus a higher chance of occurring during monitoring. Similarly, if the expected IAT for a tracepoint is greater than 10*monitoring time, it is considered to have a high expected IAT and thus a lower chance of occurring during monitoring.

For example, a monitoring system may be monitoring a web browsing application. In the browser application source code, tracepoints related to network connectivity, inter-network communications, data rendering and display, and other common functions may have a low expected IAT as they are commonly called and used during operation of the web browser. Conversely, tracepoints related to seldom used functions such as saving and printing may have larger expected IATs. The tracepoints would thus be organized 104 according to their expected IATs into appropriate buckets, and assigned 106 triggers proportionally based upon the likelihood of that tracepoint being called. To continue the above example, a smaller number of triggers would be assigned 106 to the tracepoints associated with network connectivity, inter-network communications and data rendering and display (i.e., the tracepoints with a higher likelihood of being called), and a larger number of triggers would be assigned to the tracepoints associated with saving and printing (i.e., the tracepoints with a lower likelihood of being called).

To accurately and fairly assign 106 the triggers, the monitoring device may use a credit system to allocate a maximum allowed number of triggers to tracepoints for monitoring in each bucket. The total credit may equal the expected number of trigger events per unit of time. For example, in bucket x, the IAT of a tracepoint may be expected to be greater than $2^x$ unit time. Therefore, if the tracepoint is monitored for $2^x$ time units, that tracepoint may be expected to occur one time.

In an example, the number of trigger events for each tracepoint within a unit time may be regarded as an independent random variable $X_i$, following a Poisson distribution with parameter $\lambda_i$. A tracepoint i in bucket x will have a distribution $\lambda_i <= 1/2^x$. Therefore, within a unit time, the total number of trigger events of all the tracepoints in bucket x follows a Poisson distribution $\lambda_{bucketx} A_x = 2^x * N_x/N * \text{total}_{credit}$, where $N_X$ is the dynamic cardinality (both the active and inactive number of tracepoints in a particular bucket) of bucket x and N is the total number of tracepoints in the application being monitored. Similarly, in the above equation, $A_x$ may be defined as the number of tracepoints in bucket x with triggers installed such that $2^{x}*N_x/N*\text{total}_{credit}$, thereby having the effect of keeping the number of trigger events under a budget of $\text{total}_{credit}$. Then, $\lambda_{bucketx} <= N_x/N*\text{total}_{credit}$. Therefore, the total number of trigger events in a unit time follows a Poisson distribution with parameter $\lambda=\text{sum}(\lambda_{bucketx}) <= \text{sum}(N_x/N*\text{total}_{credit}) = \text{total}_{credit}$. Thus, $\text{total}_{credit}$ is an upper bound of the expected trigger event number for a particular bucket.

To continue the above example, the total number of tracepoints being monitored in bucket x should be no greater than $\text{ceil}(2^{x}*N_k/N*\text{total}_{credit})$. One potential issue though is a round-up issue. For example, a bucket with only a few tracepoints may starve, i.e., it may not get enough credits to enable a single tracepoint to monitor. Using a floor calculation instead of the ceiling calculation above may solve the issue of bucket starving. Another potential issue is for a small overall N (e.g., a program with few tracepoints), some buckets may not have enough tracepoints to satisfy $N_x>2^{x}*N_x/N*\text{total}_{credit}$. This may result in a bucket not fully maximizing its credit allotment. This inequity may yield $x<\log 2(N/\text{total}_{credit})$. Therefore, for small values of $N/\text{total}_{credit}$, buckets with larger tracepoint indexes may not fully utilize their associated trigger credit. However, using the monitoring scheme as described herein, the accuracy of the strategy is not affected, only efficiency in terms of credit usage.

Once the triggers are assigned 106, the monitoring device may monitor 108 the execution of the computer application for any tracepoint occurrence. If a tracepoint is called, the specific triggering code inserted into the application's machine code will provide a notification to the monitoring system. The fraction of time that a tracepoint is monitored 108 may be determined by the number of tracepoints in the same bucket. The time to finish monitoring all the tracepoints in bucket x in a round-robin (or randomly selected) manner is about $N_x/(2^{x}*N_x/N*\text{total}_{credit})*2^{x}=N/\text{total}_{credit}$, which is independent of the bucket index. Therefore, if the monitoring process runs for a substantial amount of time, each tracepoint may have an equal chance of being monitored. However, as the period of monitoring a tracepoint is usually less than $2^{x}$ (e.g., once hit the system stops monitoring that tracepoint and stats a new trigger the next time unit) and there are cases where the credits are not fully used, the practical monitoring time for each tracepoint may deviate from a theoretical total simulation time.

The monitoring system may determine 110 if the current monitoring period should continue based upon the allotted time for monitoring and the amount of tracepoints that have already been triggered. For example, if a high number of tracepoints have occurred and the average expected IAT of the remaining triggered tracepoints indicates that the monitoring process will exceed the budgeted cost for the monitoring, the monitoring system may determine 110 the monitoring process should end for that specific time period.

Figure 3:
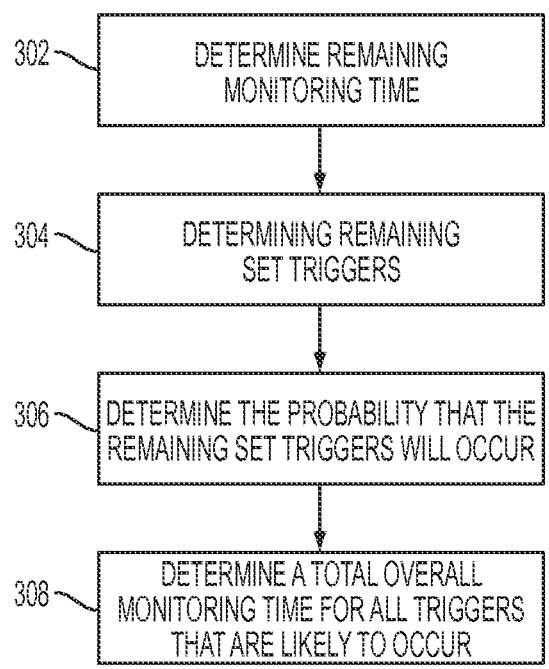
FIG. 3 depicts a sample flowchart for determining whether to continue monitoring according to various embodiments.

FIG. 3 illustrates a sample flowchart expanding upon the determination 110 to continue monitoring as shown in FIG. 1. The monitoring system may determine 302 any remaining monitoring time left in the monitoring period (e.g., ½ the time period remaining) Additionally, the monitoring system may determine 304 the remaining triggers that have not yet fired. It should be noted that while determining 302 and determining 304 are shown as a linear progression of the process illustrated in FIG. 3, this is shown merely by way of example. The determining 302 and determining 304 may occur in the opposite order, or may occur simultaneously depending upon the implementation of the monitoring system.

Each trigger has an associated time which includes the amount of time to set the trigger, the amount of time used when the trigger is fired, and the amount of time to shut off the trigger if the trigger does not fire during the monitoring period. For a trigger that has already fired, the amount of time to shut off the trigger will be zero until that trigger is reset during another monitoring period. Based upon these associated times, the monitoring system may determine 308 a total overall monitoring time for the set triggers as based upon the probability that each of the triggered tracepoints will occur.

If the determined 308 total overall monitoring time exceeds the determined 302 remaining monitoring time, the monitoring system may take action to prevent the monitoring from exceeding the budgeted cost for the monitoring. For example, a specific disaster recovery strategy may include a maximum number M of trigger events as allowed by the resource requirements of the application being monitored and the budget cost for monitoring a potential disaster, as this might cause execution errors. A disaster control threshold may be defined as a number of trigger events m, such that $t(m)+t(\text{cleanup})<=t(M)$, where $t(m)$ is the time associated for each tracepoint that is likely to trigger during the monitoring period, and $t(\text{cleanup})$ is the time associated with turning off all triggers that do not fire during the monitoring period. A standard deviation of the number of trigger events may also be calculated that is equal to the square root of the mean value of the expected trigger firings. Thus, the total standard distribution of the total trigger events equals $\text{sqrt}(\text{total}_{credit})$. Therefore, a threshold $h=\text{total}_{credit}+3*\text{sqrt}(\text{total}_{credit})$ may be set to indicate any statistical outliers in the disaster recovery algorithm. Additionally, to lower the likelihood of disaster recovery, m may be set to a greater value than h, thus reducing the likelihood of requiring disaster recovery.

Referring again to FIG. 1, if the monitoring system determines 110 the monitoring should continue, the monitoring system may further monitor 108 the tracepoints for any event occurrence. Conversely, if the monitoring system determined 110 the monitoring should not continue (i.e., the remaining triggers are likely to exceed the budget cost, or the monitoring time period has ended), the monitoring system may stop 112 monitoring and shut off the remaining triggers in a single batch operation.

After a monitoring period is stopped 112, the monitoring system may reassign 106 the triggers to the sorted tracepoints in the buckets and start a new monitoring period. Additionally, the monitoring system may place tracepoints that were previously monitored into an inactive list within is bucket, to further ensure that each tracepoint within a bucket is called at least once throughout the monitoring process.

Optionally, the monitoring device may determine 114 updated expected IATs for the tracepoints based upon the monitored operation of the application in the previous monitored time period. Updating 114 the expected IATs may use a similar process as that described in FIG. 2 above, with updated information based upon the previous monitored period. After the expected IATs are updated 114, the monitoring system may reassign 104 the tracepoints into appropriate buckets.

Figure 4:
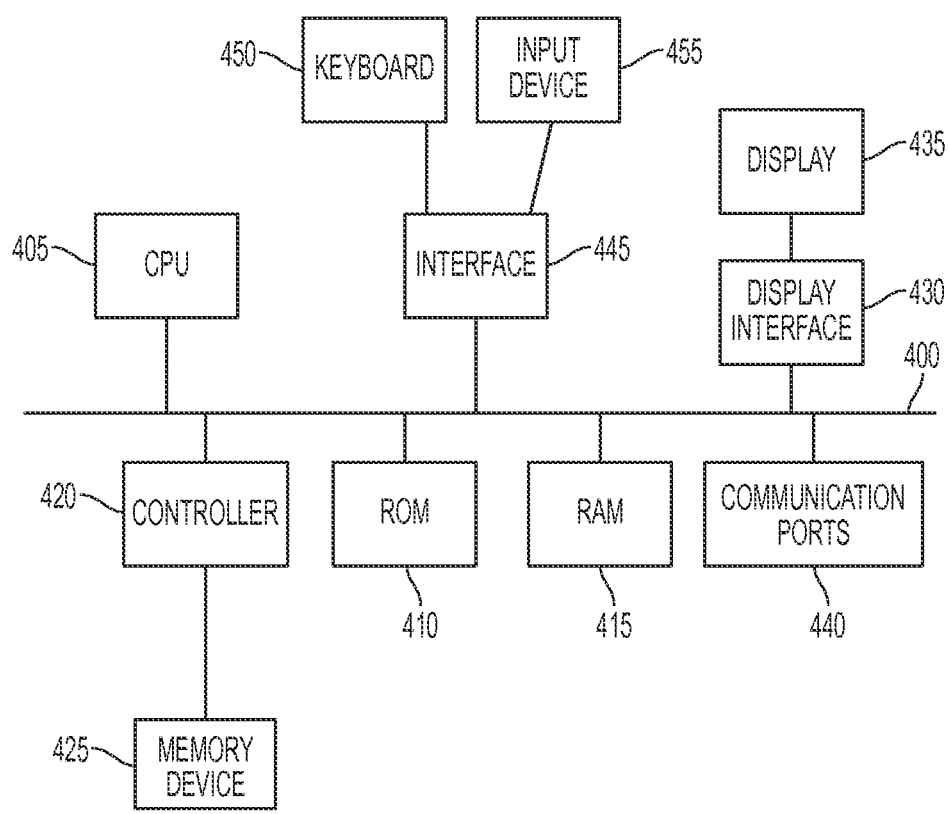
FIG. 4 depicts various embodiments of a computing device for implementing the various methods and processes described herein.

The calculations and derivations as described above may be performed and implemented by an operator of a monitoring computing device. FIG. 4 depicts a block diagram of internal hardware that may be used to contain or implement the various computer processes and systems as discussed above. An electrical bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is a processing device, computing device or processor as such terms are used within this disclosure. Read only memory (ROM) 410 and random access memory (RAM) 415 constitute examples of memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. A communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of monitoring execution of a program by a processor to determine whether a tracepoint has occurred, the method comprising:
   receiving, by a sampling module, a budget cost for monitoring occurrence of a plurality of tracepoints that may occur as a result of operation of a processing device;
   organizing a plurality of tracepoints into a plurality of buckets such that each of the buckets corresponds to a range of expected interarrival times, and all tracepoints in a bucket have an expected interarrival time that is within the corresponding range for that bucket;
   assigning a trigger to a first plurality of the bucketed tracepoints to yield a plurality of triggered tracepoints, wherein the triggers are proportionally assigned such that a tracepoint having a low associated expected interarrival time is less likely to be assigned a trigger than an tracepoint having a high associated expected interarrival time, wherein an expected cost of the triggered tracepoints does not exceed the budget cost; and
   monitoring tracepoint occurrence during a first period of operation of the processing device for occurrence of triggered tracepoints.

2. The method of claim 1, wherein organizing a plurality of tracepoints into a plurality of buckets comprises:
   creating a plurality of buckets by:
      identifying a total range of all interarrival times,
      performing a logarithmic division of the total range of interarrival times to produce a plurality of intermediate ranges, and
      assigning each bucket to a unique intermediate range; and
   placing each of the first plurality of tracepoints into an appropriate bucket based upon that tracepoint's expected interarrival time.

3. The method of claim 1, wherein each trigger comprises an associated triggering time, wherein the triggering time comprises:
   a first amount of time associated with setting the trigger;
   a second amount of time associated with firing the trigger; and
   a third amount of time associated with turning the trigger off.

4. The method of claim 3, further comprising:
   for each triggered tracepoint, determining a probability that the triggered tracepoint will occur during the first period of operation;
   for each triggered tracepoint that is determined to be likely to occur during the first time period, determine a total monitoring time based upon the associated triggering times for each of the triggered tracepoints that are determined to occur; and
   comparing the total monitoring time against the budget cost to determine a likelihood the monitoring will exceed the budget cost.

5. The method of claim 1, further comprising:
   reassigning a trigger to a second plurality of bucketed tracepoints; and
   monitoring tracepoint occurrence during a second period of operation of the processing device for occurrence of triggered tracepoints.

6. The method of claim 1, further comprising updating, after monitoring the first plurality of tracepoints for a plurality of time periods, the expected interarrival times associated with each of the plurality of tracepoints based upon an updated likelihood of each of the plurality of tracepoints occurring.

7. The method of claim 6, further comprising:
   identify a third plurality of tracepoints that comprise an expected interarrival time greater than an expected overall operational time of the processing device; and
   classify the identified third plurality of tracepoints as likely to never occur during operation of the processing device.

8. The method of claim 7, further comprising assigning a high number of triggers to the tracepoints classified as likely to never occur.

9. The method of claim 1, further comprising determining a total elapsed time associated with each trigger occurrence as each triggered tracepoint occurs during the monitoring.

10. The method of claim 9, further comprising determining an updated probability of each remaining triggered tracepoint occurring exceeding the budget cost.

11. The method of claim 10, further comprising shutting off each of the remaining triggers as a single batch operation if the updated probability of each remaining triggered tracepoint occurring does exceed the budget cost.

12. The method of claim 1, wherein the budget cost comprises a portion of a period of time of operation of the processing device that is determined to be an acceptable loss of processing time.

13. A system for monitoring execution of a program to determine whether a tracepoint has occurred comprising:
- a processing device; and
- a non-transitory storage medium operably connected to the processing device and configured to store a set of instructions that, when executed, cause the processing device to:
  - assign each of a plurality of tracepoints to one of a plurality of buckets based upon an expected interarrival time of that tracepoint,
  - proportionally assign one or more triggers to the plurality of tracepoints such that the triggers are distributed amongst each of the plurality of buckets,
  - monitor execution of a computer program for an event occurrence related to one or more triggered tracepoints being triggered for a first period of time,
  - in response to an event occurrence, process a called tracepoint to identify and remove the trigger associated with the called tracepoint and record that the tracepoint has been called, and
  - after the first period of time has elapsed, turn off all remaining triggers associated with tracepoints that were not called during the first time period.

14. The system of claim 13, wherein each tracepoint is assigned to one of the plurality of buckets such that each of the buckets corresponds to a range of expected interarrival times, and all tracepoints in a bucket have an expected interarrival time that is within the corresponding range for that bucket.

15. The system of claim 13, further comprising instructions for causing the processing device to determine a total time associated with each trigger occurrence as each triggered tracepoint occurs during the monitoring.

16. The system of claim 15, further comprising instructions for causing the processing device to determine an updated probability of each remaining triggered tracepoint occurring exceeding a budget cost for monitoring.

17. The system of claim 16, further comprising further comprising instructions for causing the processing device to shut off each of the remaining triggers as a single batch operation if the updated probability of each remaining triggered tracepoint occurring does exceed the budget cost.

18. A method of preventing a monitoring system from exceeding a budget cost, the method comprising:
- monitoring, by a processing device, tracepoint occurrence during a first period of operation of the processing device for a plurality of triggered tracepoints;
- determining, by the processing device, a triggering time associated with each triggered tracepoint of the plurality of triggered tracepoints that has not been called;
- determining, by the processing device, a probability for each of the plurality of triggered tracepoints that have not been called, wherein the probability indicates whether a tracepoint is likely to be called before expiration of the first period of operation;
- determining, by the processing device, a total remaining time based upon each tracepoint that is probable to be called before expiration of the first period of operation, wherein the total remaining time is a sum of the triggering times for each of the tracepoints that is probable to be called; and
- if the total remaining time exceeds a remaining time left in the first period of operation, shutting off, by the processing device, all remaining triggers in a single batch operation.

19. The method of claim 18, wherein each tracepoint is one of a plurality of tracepoints assigned to one of a plurality of buckets such that each of the buckets corresponds to a range of expected interarrival times, and all tracepoints in a bucket have an expected interarrival time that is within the corresponding range for that bucket.

20. The method of claim 18, wherein each triggering time comprises:
- a first amount of time associated with setting a trigger for a particular tracepoint;
- a second amount of time associated with firing the trigger for the particular tracepoint; and
- a third amount of time associated with turning the trigger off for the particular tracepoint.

* * * * *